Patented Sept. 20, 1932

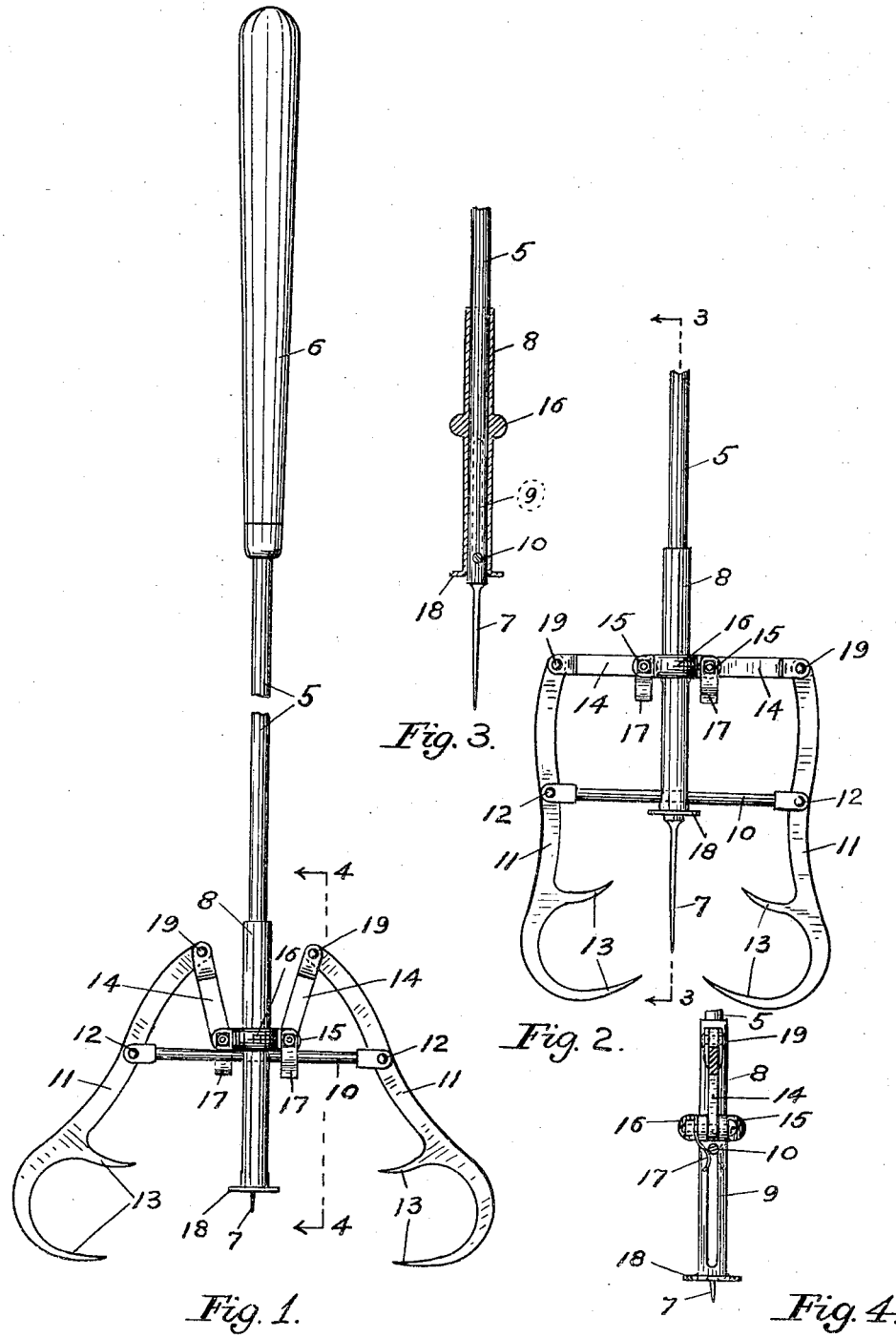

1,878,951

UNITED STATES PATENT OFFICE

CHARLES W. MADISON, OF CENTURIA, WISCONSIN

GRAPPLE

Application filed August 5, 1931. Serial No. 555,198.

This invention relates to fishing tackle and the primary object is to provide an efficient, practical, and highly novel form of gaff or grapple for seizing and holding a hooked fish, so that the line hook or hooks can be removed with comparative safety and so that the fish cannot break loose or escape at the time it is brought up adjacent to the angler whether wading or in a boat. More particularly the object is to provide a combination grapple and spear which when engaged with the fish will automatically lock itself closed over the body thereof so that the angler, when once having seized the fish, need make no other manipulation than to lift it to a safe place, after which the grapples may be removed and reset until again brought into use. Further and more specific objects will be disclosed in the course of the following specification, reference being had to the accompanying drawing, wherein:

Fig. 1 is a plan view of the device with a portion of the shank broken away and with the grapple levers in their set positions.

Fig. 2 is a plan view similar to the lower portion of Fig. 1, but showing the grapple levers in their tripped positions.

Fig. 3 is a sectional elevation as seen substantially on the line 3—3 in Fig. 2.

Fig. 4 is a sectional view on the line 4—4 in Fig. 1.

Referring to the drawing more particularly and by reference characters, 5 designates the main shank rod or shaft having a handle 6 at one end and terminating at its other end in an axial prong or spear 7, the same preferably being integrally formed with the rod 5. A sleeve 8 is slidably secured on the lower end of the shaft 5 and has a pair of oppositely disposed longitudinal slots 9 which slidably engage a cross bar 10 that is rigidly anchored at its middle in the shaft 5 so that the sleeve 8 has freedom for longitudinal movement on the shaft 5, and such movement is limited only by the lengths of the slots 9.

A pair of grapple levers 11 are pivotally secured at points intermediate their respective ends as at 12 to the ends of the cross bar 10, and these levers are provided at their lower ends with pairs of hooks or tines 13. The opposite or upper ends of the levers 11 are connected by toggle links 14 to opposite bearing ears 15 of a collar 16 which constitutes an integral enlargement of the sleeve 8 at a point intermediate the ends of the latter. The ears 15 carry a pair of depending spring clips 17 which are arranged so as to yieldably engage the cross bar 10 when the sleeve 8 is in its lowermost position, as shown in Fig. 1.

The operation of the device may be briefly described as follows:

When the device is to be "set" in readiness for use, the hooked ends of the grapple levers are spread apart and the sleeve 8 is moved down over the prong 7 until the spring clips 17 snap into engagement over the cross bar 10, as shown in Figs 1 and 4. When a hooked fish is now to be seized the operator effects a quick action of the device toward the body of the fish so that the prong 7 will enter the flesh and so that the resistance of the fish about the prong 7 will act against a flange or enlargement 18 at the lower end of the sleeve 8 to move the latter upwardly on the shank or shaft 5, and this action in turn operates through the links 14 to close in the lower or pronged ends of the levers 11, which then securely engage the sides of the fish body.

When the engagement is fully completed the toggle links 14 will be in the positions shown in Fig. 2 and as the lugs 15 are then on a dead center line between the lever and link pivot connections 19, and as the sleeve 8 cannot move down against the resistance of the engaged fish body, the grapple levers will be held rigidly in place until manually disengaged by manipulation of the sleeve 8 downwardly.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A grapple comprising a shank having a cross bar supporting a pair of spaced pivots at the opposite ends of said cross bar, a pair of pronged levers fulcrumed, intermediate their ends, on said pivots, a member slidable on the shank, and a toggle device connecting said levers and operatively attached to said slidable member.

2. A grapple comprising a shank having a rigid cross bar supporting a pair of spaced pivots, a pair of pronged levers fulcrumed, intermediate their ends, on said pivots, a member slidable on the shank, and links connecting said member to the levers, said slidable member having an extension disposed between the pronged ends of said levers for actuating the toggle to effect a gripping action to the levers.

3. A grapple comprising a shank, a cross bar rigidly secured to the shank and supporting a pair of spaced pivots, a pair of pronged levers fulcrumed, intermediate their ends, on said pivots, a member slidable on the shank, and links connecting said member to the levers, said slidable member having an extension disposed between the pronged ends of said levers for actuating the toggle to effect a gripping action to the levers, and means for releasably securing the pronged levers in an open position.

4. A grapple comprising a shank, a cross member carried by the shank, a pair of grapple levers fulcrumed to the outer ends of said cross member, a sleeve slidable on the shank and arranged to extend in advance thereof when the levers are open, and means for closing the levers toward each other operative by moving the sleeve upwardly on the shank, said means being self-locking in character when moved to a predetermined position.

5. A grapple comprising a shank, a cross member carried by the shank, a pair of grapple levers fulcrumed to the outer ends of said cross member, a sleeve slidable on the shank and arranged to extend in advance thereof when the levers are open, and means for closing the levers toward each other operative by moving the sleeve upwardly on the shank, said means being self-locking in character when moved to a predetermined position, and yieldable means for releasably retaining the levers in open position.

6. A grapple comprising a shank, a cross member carried by the shank, a pair of grapple levers fulcrumed to the outer ends of said cross member, a sleeve slidable on the shank and arranged to extend in advance thereof when the levers are open, and means for closing the levers toward each other operative by moving the sleeve upwardly on the shank, said shank having a spear acting prong extending integrally from the end thereof adjacent the levers.

7. A grapple comprising a shank, a cross bar carried by the shank, a sleeve slidable on the shank and having longitudinal slots to slidably receive the cross bar, grapple levers fulcrumed on the outer ends of the cross bar, and operative connections between the sleeve and said levers.

8. A grapple comprising a shank, a cross bar carried by the shank, a sleeve slidable on the shank and having longitudinal slots to slidably receive the cross bar, grapple levers fulcrumed on the outer ends of the cross bar, and links connecting the levers with the sleeve.

9. A grapple comprising a shank, a cross bar carried by the shank, a sleeve slidable on the shank and having longitudinal slots to slidably receive the cross bar, grapple levers fulcrumed on the outer ends of the cross bar, operative connections between the levers and sleeve, and means movable with the sleeve for releasably retaining the grapple levers in open or set positions.

10. A grapple comprising a shank, a cross bar carried by the shank, a sleeve slidable on the shank and having longitudinal slots to slidably receive the cross bar, grapple levers fulcrumed on the outer ends of the cross bar, operative connections between the levers and sleeve, and means movable with the sleeve for releasably retaining the grapple levers in open or set positions, said sleeve being provided with an enlargement at its end between the gripping ends of the levers.

Signed at Centuria, in the county of Polk, and State of Wisconsin, this 31 day of July, 1931.

CHARLES W. MADISON.